(12) United States Patent
Long

(10) Patent No.: US 6,226,010 B1
(45) Date of Patent: *May 1, 2001

(54) COLOR SELECTION TOOL

(75) Inventor: Timothy Merrick Long, Lindfield (AU)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/663,920

(22) Filed: Jun. 14, 1996

(30) Foreign Application Priority Data

Jun. 16, 1995 (AU) .................................................. PN3601

(51) Int. Cl.$^7$ .................................................. G06T 11/40
(52) U.S. Cl. .......................... 345/431; 345/150; 345/153
(58) Field of Search .................................. 345/431, 150, 345/153, 348

(56) References Cited

U.S. PATENT DOCUMENTS

| | | | |
|---|---|---|---|
| 4,896,291 | * 1/1990 | Gest et al. | 345/353 |
| 5,103,407 | * 4/1992 | Gabor | 345/431 |
| 5,123,088 | 6/1992 | Kasahara et al. | 345/348 X |
| 5,254,978 | 10/1993 | Beretta | 345/150 |
| 5,311,212 | * 5/1994 | Beretta | 345/150 |
| 5,487,020 | 1/1996 | Long | 364/571.01 |
| 5,506,946 | * 4/1996 | Bar et al. | 345/431 |
| 5,552,805 | 9/1996 | Alpher | 345/153 |
| 5,579,471 | * 11/1996 | Barber et al. | 345/326 |
| 5,627,951 | 5/1997 | Chaplin et al. | 345/431 |

OTHER PUBLICATIONS

James D. Foley, et al., Computer Graphics: Principles and Practice, Second Edition, Addison–Wesley Publishing Co., 1990 pp. 574–603.

* cited by examiner

*Primary Examiner*—Mark Zimmerman
*Assistant Examiner*—Lance W. Sealey
(74) *Attorney, Agent, or Firm*—Fitzpatrick, Cella, Harper & Scinto

(57) ABSTRACT

A method and apparatus for displaying color for selection is disclosed. The method includes the steps of displaying a currently selected color in a first predefined area and displaying a series of blend areas each containing a blend from a first blend color to a second blend color, and at least one of the blend colors being substantially the same as the currently selected color. Preferably, each of the second colors is a predetermined distance in a color space from the currently selected color. The first predefined area may be located in a central area and each of the blend areas may be located around the central area and the at least one of the blend color in the blend area being located substantially closest to the central area. The blend areas are located radially around the central area. The color space is preferably the CIE L*a*b* color space and the blends are substantially continuous in the CIE L*a*b* color space. In an alternate embodiment, there is disclosed a method and apparatus for generating colors for selection of a color by a user. The method comprises the steps of (a) selecting a first color, (b) generating a plurality of color blends, each having the selected first color at one end of the corresponding blend and a second color at an opposite end of the blend wherein the second colors are related to the first color and each other by predetermined characteristics, and (c) displaying the selected first color and the plurality of blends. The blends are radially configured around the selected first color dependent on one of the characteristics with each blend having the corresponding selected first color at the one end positioned adjacent to the selected first color. The plurality of second colors is generated dependent upon one of the predetermined characteristics being a radial distance from the selected first color in a color space. A further step involves, once interation of steps (a), (b) and (c) has been completed, mapping a palette image using the plurality of blends corresponding to the resultant selected first color.

21 Claims, 5 Drawing Sheets

COLOR SELECTION TOOL

BACKGROUND

The present invention relates to a method and an apparatus for selecting a color and/or a transparency value of a computer graphics image.

Modern computer systems have become increasingly popular for utilisation in the production of high quality, full color images. An image consists of a number of pixels, and each pixel may be defined to be of a certain color and to have certain transparency aspects. Typically, a common format for representing a pixel is used. For example, one such common format is the Red, Green and Blue (RGB) format. In this format, each pixel may use 24 bits to represent the color, where eight bits are provided for each of the R, G and B components of the color of the pixel. With the 24-bit color definition, it is possible to represent over 16 million separate color. This effectively provides a high fidelity color space in which a large number of different colors can be represented with each color having only very minor variations in relation to the closest neighboring colors in the color space.

Still further, another eight bits may be used in the format to define a transparency aspect of each corresponding pixel. Eight bits of storage are also used for the transparency component, thereby resulting in a pixel storage size of 32 bits.

In order to choose a particular color within the gamut of all possible displayable colors in such a color space, a number of color selection tools have been used in the prior art. Most of these conventional tools rely on the display of the full color gamut of displayable colors in a compressed form. For a discussion of the utilisation of color in computer graphic images and various conventional color selection tools known in the art, reference is made to a standard text in the field such as Foley, Van Dam et.al, *Computer Graphics Principles and Practice,* 2nd Ed., Reading (Mass.): Addison-Wesley Publishing Company, Inc (1990), 574–603.

Disadvantageously, the provision of such a large number of colors to select from often results in confusion when such conventional color selection tools are used by graphic artists or the like to create computer graphic images. For example, when the full gamut of displayable colors is displayed in a small color selection area on a display, the results are such that it is typically extremely difficult for a person to distinguish between closely similar colors.

A conventional color selection system is disclosed in U.S. Pat. No. 5,254,978 that is used to create a palette of colorimetrically measured colors. The system is used to create and modify a color palette by selecting two end colors and interpellating between those two colors to form a linear blend. The operator may then select a color from the blend and add it to a palette of colors. Colors from the palette may be modified or deleted while the creation of new colors is carried out in a manner analogous to an artist's color wash. Thus, this conventional system is used to select or modify colors of a color palette by a user first selecting two separate colors to form a color wash of the color mixing region displayed on a video monitor. The wash or blend of the color mixing region is formed by interpellating colors in the CIELAB color space between the two user selected colors.

The system is disadvantageous in that it requires a number of operations to be performed in order for an operator such as a graphic artist to select or create a new color. Firstly, the user must select two colors from the color palette to be used as the end points of the blend. Once the blend has been generated, the user must then again select a color from the blend to be added to the color palette. If the user were then to wish to modify the color further, the foregoing steps would have to be iterated once again. Thus, for realistic applications, this would consequentially be disadvantageous the large number of operations and the cumbersome nature of the technique for modifying colors would not lend itself to be in readily use by a user. A further disadvantage of this technique is that only a single blend is generated between the two selected colors and therefore does not enable a user to readily visualise the relationship between the colors of a chosen blend and those of other colors having different chromaticity in the neighbouring color space.

SUMMARY

It is an object of the present invention to provide an improved color selection tool for enabling the ready selection of colors in computer graphical images.

In accordance with a first aspect of the present invention, there is provided a method of displaying color for selection, said method comprising the steps of:

displaying a currently selected color in a first predefined area; and displaying a plurality of blend areas each containing a different blend from a first blend color to a second blend color, and at least one of said blend colors being substantially the same as said currently selected color, whereby the currently selected display color and the plurality of blend areas are changeable by selecting a color from one of said currently displayed plurality of blend areas by a single input operation.

In accordance with a second aspect of the present invention, there is provided an apparatus for displaying color selectable by a user, said apparatus comprising:

means for displaying a currently selected color in a first predefined area; and means for displaying a plurality of blends in a plurality of second predefined areas each second predefined area containing a different blend from a first blend color to a second blend color and at least one of said blend colors being substantially the same as said currently selected color, whereby the currently selected color and the plurality of blend areas are changeable by selecting a color from one of said currently displayed plurality of blend areas by a single input operation.

In accordance with a third aspect, there is provided a color selection device comprising a color wheel having a radially central portion indicating a currently selected color and a series of radially increasing blends around said central portion, said radially increasing blends being blends from said currently selected color to predetermined points adjacent said currently selected color in a predetermined color space.

In accordance with a fourth aspect of the invention, there is provided a method of generating colors for selection of a color by a user, said method comprising the steps of:

(a) selecting a first color;

(b) generating a plurality of color blends, each having said selected first color at one end of said corresponding blend and a second color at an opposite end of said blend, wherein the second colors are related to said first color and each other by predetermined characteristics;

(c) displaying said selected first color and said plurality of blends, whereby said blends are radially configured around said selected first color dependent on one of said characteristics with each blend having the corresponding selected first color at said one end positioned adjacent to said selected first color.

BRIEF DESCRIPTION OF THE DRAWINGS

The preferred embodiment of the present invention is described with reference to the accompanying drawings, in which.

DETAILED DESCRIPTION

In the color selection tool of the preferred embodiment, a currently selected color is displayed with variations of the currently selected color being shown around the currently selected color. In the preferred embodiment, colors are displayed in accordance with the well-known L*a*b* color space, which is advantageous for use in the preferred embodiment in that the chromaticity components comprise the a*b* portion of the color data and the intensity component comprises the L component of the color data.

Figure 5:
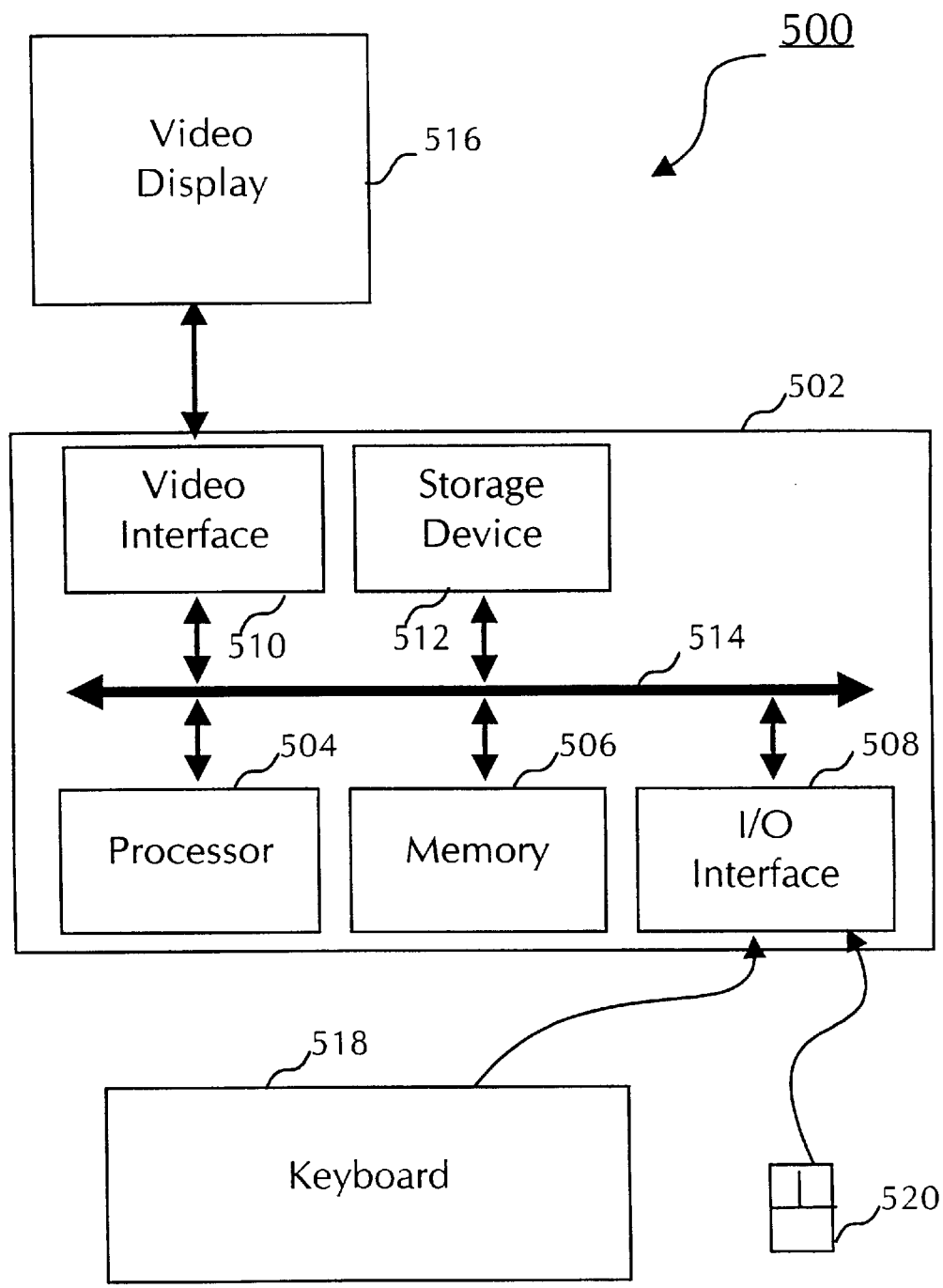
FIG. 5 is a block diagram of a conventional computer for implementing the preferred embodiment.

In accordance with the preferred embodiment, the system may be practiced using a conventional general purpose computer such as the one shown in FIG. 5. The computer system 500 consists of the computer 502, a video display 516, and input devices 518, 520. In addition, the system may also have any of a number of other output devices including line printers, laser printers, plotters, and other reproduction devices connected to the computer 502. In addition, the computer system 500 may be connected to one or more other computers using an appropriate communication channel such as a modem communications path, a computer network, or the like.

The computer 502 itself consists of a central processing unit(s) (simply referred to as a processor hereinafter) 504, a memory 506 which may include random access memory (RAW) and read-only memory (ROM), an input/output (I/O) interface 508, a video interface 510, and one or more storage devices generally represented by block 512 in FIG. 5. The storage device(s) 512 may consist of one of more of the following: a floppy disc drive, a hard disc drive, a magneto-optical disc drive, CD-ROM, or any other of a number of non-volatile storage devices well-known to those skilled in the art. Each of the components 504 to 512 is typically connected to one or more of the other devices via a bus 514 that in turn may consist of data, address, and control buses.

The video interface 510 is connected to the video display 516 and provides video signals from the computer 502 for display on the video display 516. User input to operate the computer 502 may be provided for one or more input devices. A user may use the keyboard 518 and/or a pointing device such as mouse 520 to provide input to the computer. The input devices are further described below in relation to the preferred embodiment.

Figure 3:
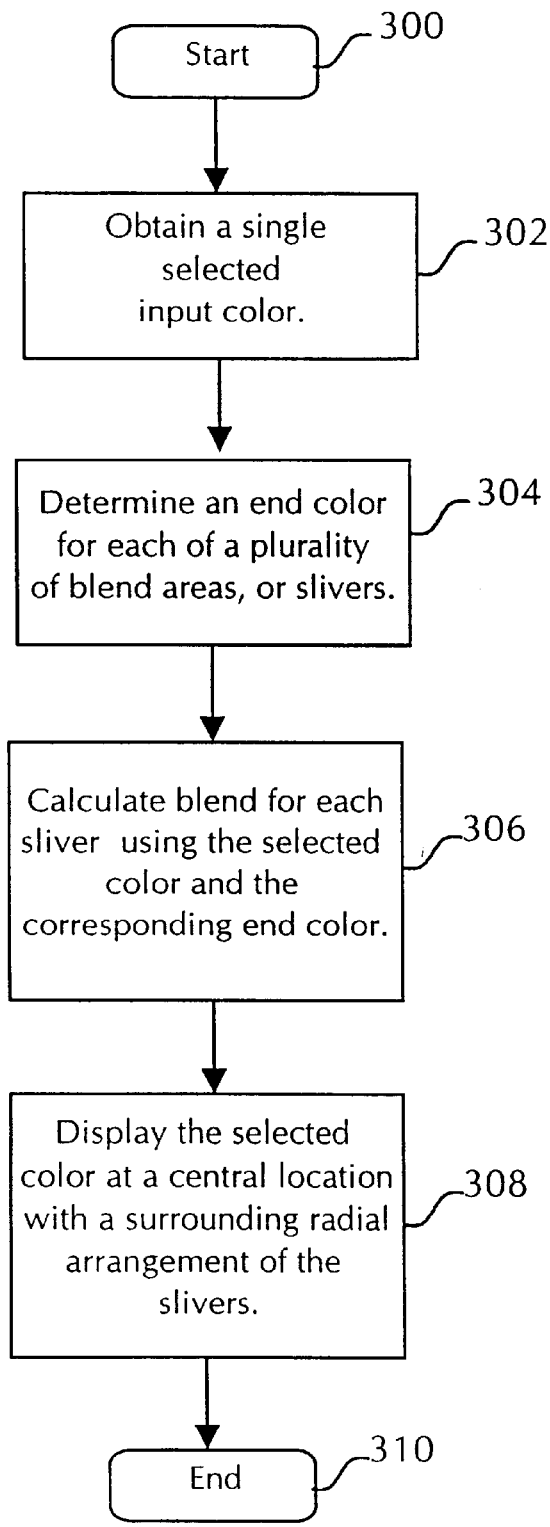
FIG. 3 is a flow diagram illustrating operation of the system according to the preferred embodiment.

The system according to the preferred embodiment utilises the computer system 500 of FIG. 5 to generate and display on the video display. 516 colors for selection of a color by a user. Operation of the system is now described with reference to FIG. 3 which illustrates the steps carried out by the preferred embodiment.

Processing begins at step 300. At step 302 a single input color is obtained by the user selecting a color from the colors displayed on the video display 516. This may be done by operating an input device such as the mouse 520 and selecting a displayed color. In step 304, a plurality of blend areas, or slivers, are generated by first determining an end color for each of the blend areas in accordance with a predetermined characteristic. Preferably, the predetermined characteristic is a predefined distance in a three dimensional color space relative to the selected input color. In step 306, a blend is calculated for each sliver using the selected input color and the corresponding end color of the blend determined in step 304. In step 308, the selected color obtained in step 302 is displayed along with the plurality of blend areas arranged in a radial distribution around the selected color on the video display 516. Processing ends at step 316.

It will therefore be appreciated that the preferred embodiment only requires a single input from the user in step 302, preferably using the pointing device 520 to generate the plurality of blends. In turn, the processing of steps 304 to 308 is automatically carried out by the computer 502 and the resulting selected color and a plurality of blends are displayed on the video display 516. Thus, the system shown in FIGS. 3 and 5, in contrast to the prior art, only requires a single operation in order for a user such as a graphical artist to readily select and/or modify a color for display in a computer graphical image. The preferred embodiment will now be further described with reference to a color selection device employed in the preferred embodiment.

Figure 1:
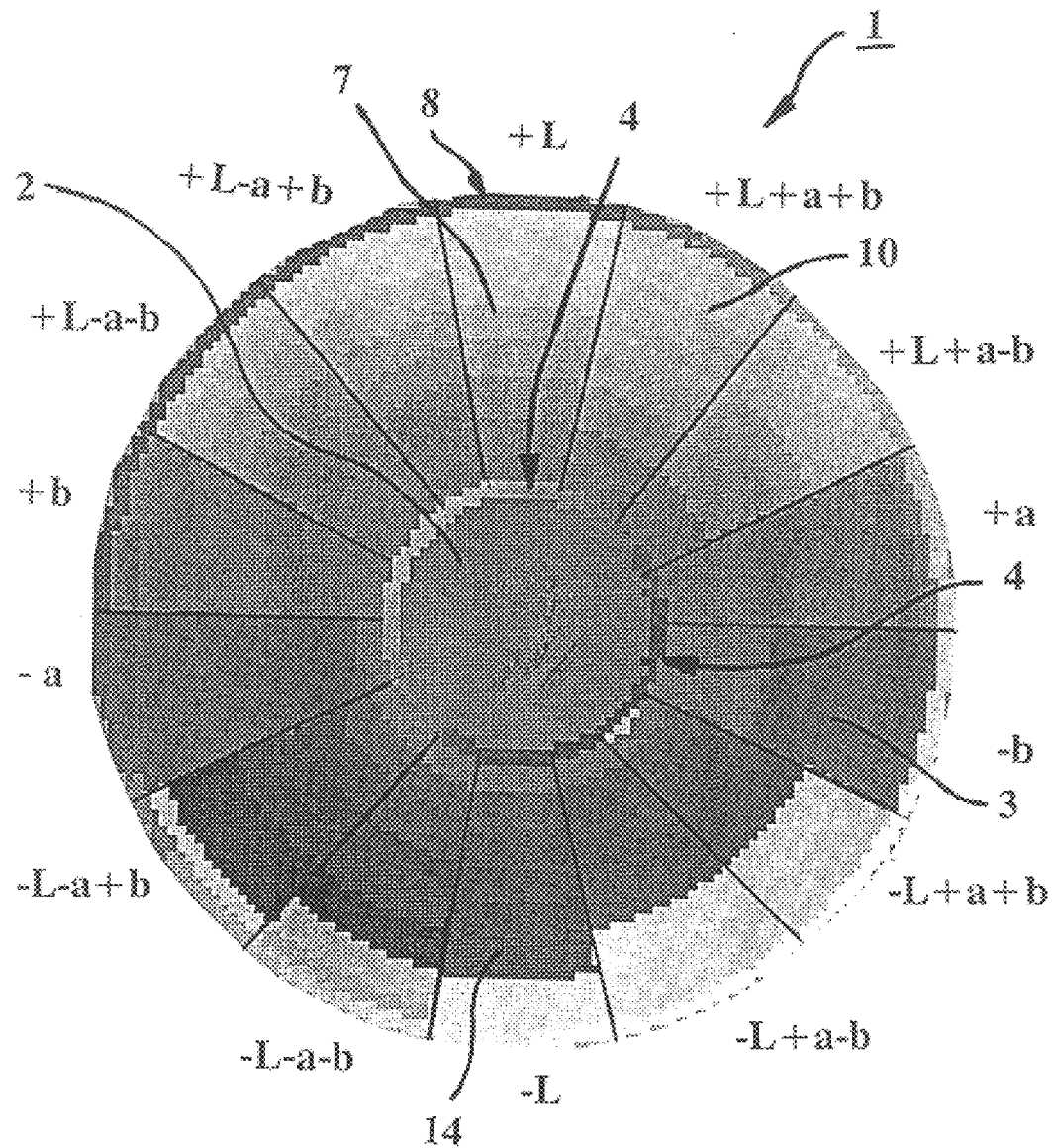
FIG. 1 is a schematic diagram illustrating a color selection wheel according to the preferred embodiment.

Referring now to FIG. 1, there is shown in schematic form a color selection device, or color wheel, 1 according to the preferred embodiment. The color selection device comprises a central portion 2, in which is displayed a single, current color taking up an area around the axis of the color wheel 1. More outwardly around the central portion 2 are located a number of exterior portions, or slivers, 3. Each of the slivers 3 comprises a blend of colors from a first color 4, being an equivalent to the currently selected color 2, to a second color at the outer rim 5 of the color wheel. Each blend is designed to blend from a first predefined color to a second predefined color in accordance with the blend's position within the color wheel 1. For example, the blend of the sliver 3 is provided to have a decreasing "b" component within the color space. Similarly, the sliver 7 comprises a blend of colors from an initial color 4, which is equivalent to the color in the central portion 2, to an outer second color 8 which differs from the color 4 in that it is simply of increased intensity (or L* component) and has the same chromaticity components. Therefore, the blend from the first color 4 to the second color 8 is one of increasing intensity, equivalent to adding an increasing "L*" component to the image.

The sliver 10 is also a blend from a first color 4 to a second color 11, where the blend comprises adding intensity and a* and b* components to the blend. Likewise, the remaining slivers within the color wheel 1 comprise blends with changing color components as illustrated.

The color selection device 1 may be used by a graphic artist to create or select a color, with the currently selected color being displayed within the central portion 2. An interactive pointing device, such as a "mouse" or the like, may be used to select a newly desired color within the color wheel 1 by "clicking" on that color. Upon selection of the newly desired color, the colors of the color wheel device 1 are recalculated with the selected, newly desired color being displayed in the central portion 2. The other colors of the color wheel 1 are recalculated relative to the selected color within the central portion 2. This process may be iterated until a satisfactory color is located with the finally selected color becoming the current color for the image, drawing objects, or the like.

Preferably, slivers that are diametrically opposed to one another (e.g., slivers 7 and 14) are also diametrically opposed around the central color in the underlying L*a*b* color space.

Thus, the preferred embodiment provides a system for the selection (or displaying for selection) of a series of color blends. Advantageously, a user only has to select a single color and the blends around the color wheel are calculated using the selected color. The plurality of blends are radially distributed about the selected color and CIELAB space, although other color spaces may be practiced without departing from the scope and spirit of the present invention. Therefore, a series of blends are produced between the selected color and a plurality of colors distributed about the selected color in the color space. Again, this provides a significant advantage over the prior art in that it allows the user to navigate readily and rapidly about the color space by selecting one color at a time.

Figure 2:
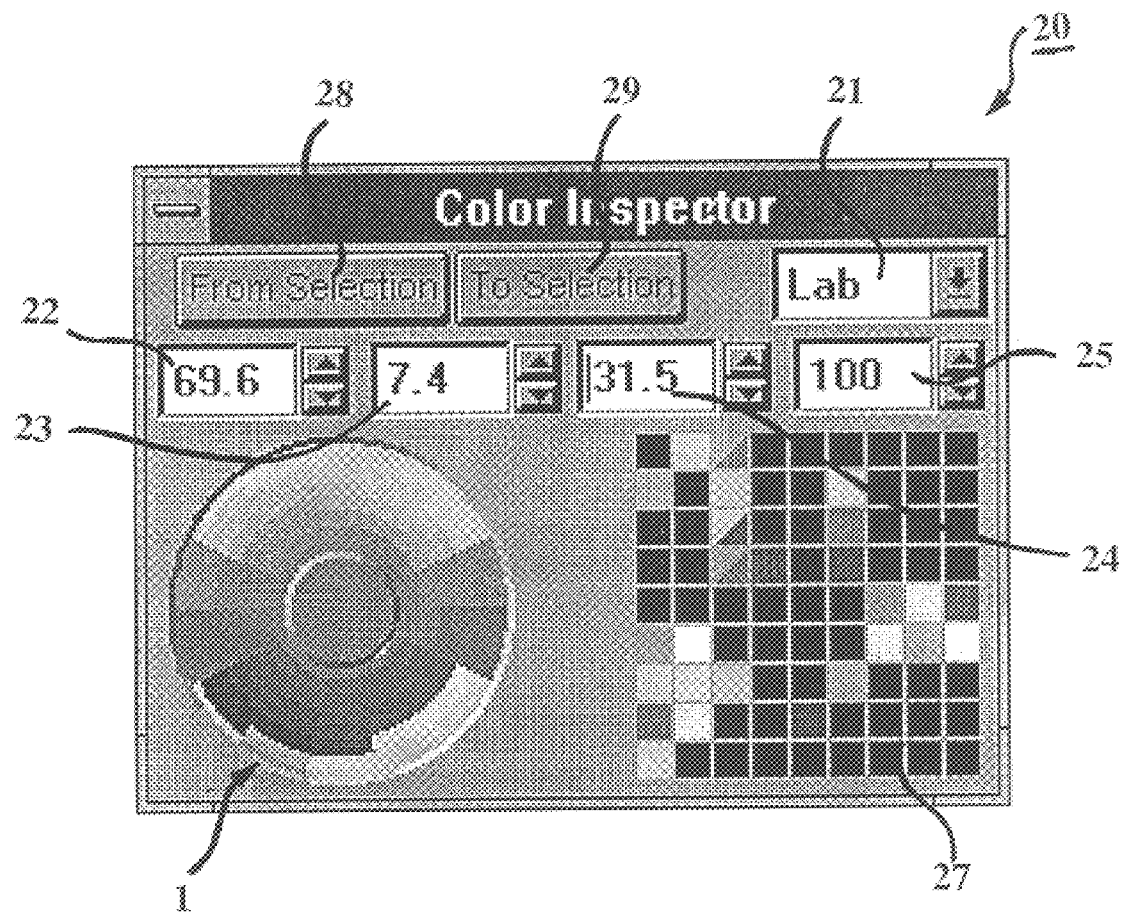
FIG. 2 is a schematic diagram illustrating the incorporation of the color selection wheel of FIG. 1 into a color selection tool.

FIG. 2 illustrates a preferred color selection device 1 that is constructed under the Microsoft Windows Computer Interface. The selection tool 20 is referred to as a "Color Inspector". In addition to the color selection device 1, the selection tool 20 includes a number of other color tool selection aids. For example, different ways of representing the color space may be selected via color space input area 21. The color spaces may optionally include Commission Internationale de l' Eclairage (CIE) L*a*b* (the default), SMPTE RGB, hue saturation value (HSV), and CIE XYZ. Also, provision may be made such that the actual color space coordinates can be alternatively entered in dialogue boxes 22, 23 and 24. A dialogue box 25 may also be utilised to set the degree of transparency of the selected color. A palette area 27 is provided for saving a previously created color that may be useful at a future time. A button 28 is provided to extract color from various objects that may have been selected under a current application program, with the button 29 being provided to export using the color inspector 20 the currently selected color to a selected object of a particular application program.

Figure 4:
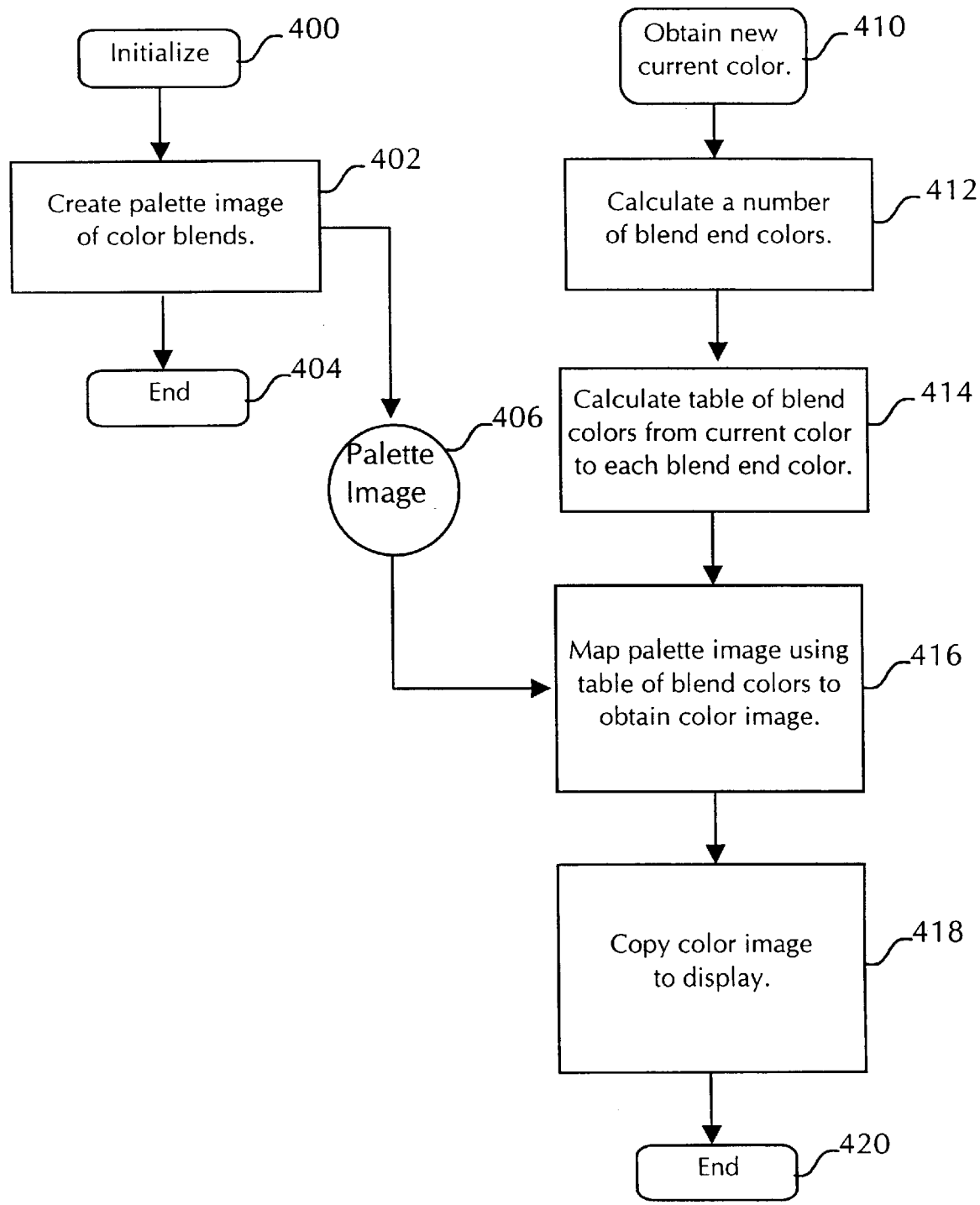
FIG. 4 is a more detailed flow diagram of the operation of the system of FIG. 3.

Another embodiment of the invention is shown in FIG. 4. Optionally, the system may involve two separate processes, one of which involves initialisation of a palette image and the second involves the display of the color selection device. As shown in FIG. 4, initialization begins in step 400. In step 402, a palette image of color blends is created. The palette image 406 produced in step 402 is provided as an input to step 416, described below. In step 404, the initialization-process terminates.

In step 410, a new current color is obtained by the user selecting a color displayed on the video display 516. The new current color will be the start color for a number of blends to be generated. In step 412, the end color for each of the number of blends is calculated. Preferably, the number of blends is fourteen. The blends may be calculated dependent upon the radial distance from the new current color and the radial angle about the new color. In step 414, for each blend, a table of blends colors is calculated from the current color to the corresponding end color. Preferably, the table comprises a lookup table (LUT) stored in the memory 506 of the computer 502. However, it will be apparent to a person skilled in the art that any of the number of data storage techniques may be utilised beside such lookup tables without departing from the spirit and scope of the present invention. In step 416, the number of blends and the palette image 406 are used to map the palette image using the table of blend colors to obtain a color image. In step 418, the resulting color image is displayed. Optionally, the color space used in the method of FIG. 4 may be either the CIELAB or RGB color space. It will be apparent to a person skilled in the art that other color spaces may be practiced without departing from the scope and spirit of the present invention.

In view of the foregoing, the actual determination of color within the color selection device 1 can be achieved in a number of different ways that will be readily apparent to those skilled in the art of computer graphics programming without departing from the scope and spirit of the present invention. In accordance with the preferred embodiment, the accompanying Appendix A contains a computer program written in the C programming language for determining the 10 color within color selection device 1 and is incorporated herein by reference.

The foregoing describes only one embodiment of the present invention. However, modifications and changes obvious to those skilled in the art may be made thereto without departing from the scope and spirit of the invention. For example, a number of modifications may be provided to the various blends. Further, the blends may be represented in other color spaces than those mentioned above, although the L*a*b* color space is preferred. Also, the coarseness of the blend may be a user defined parameter. Further, the actual blend need not be a linear blend and may, for example, be exponential in nature, thereby providing a "fish eye" lens view of the color space.

- 8 -

APPENDIX A

```
/*
 * The color wheel in the color inspector.
 */
#include "icihdrs.h"
#include "kit.h"
#include "insputil.h"

#define NSTEPS          8       /* Number of steps in blends. See SwatchIndex below. */
#define DLAB            30      /* Net delta in Lab of wheel blends. */
#define SWATCH_OUTER_RADIUS 50  /* Fundamental determiner of height of swatch. */
#define SWATCH_GRID_SIZE    8   /* Size of black and white under color boxes. */
#define SWATCH_INNER_RADIUS (int)(SWATCH_OUTER_RADIUS / 3.33)
#define SWATCH_WIDTH        (2 * SWATCH_OUTER_RADIUS /* + 30*/)
#define SWATCH_HEIGHT       (2 * SWATCH_OUTER_RADIUS)

#define CLAMP255(f)     ((f) >= 255 ? 255 : (f) <= 0 ? 0 : (unsigned char)(f))

typedef struct RGBO
{
    unsigned char   C[4];
}
    RGBO;

typedef struct SwatchPalette
{
    RGBO    sp_Background;          /* Assumed first element in code below. */
    RGBO    sp_BackBlendLight[NSTEPS];  /* Background to light background color. */
    RGBO    sp_BackBlendDark[NSTEPS];   /* Background to dark background color. */
    RGBO    sp_Wheel[3][3][3][NSTEPS][2];/* [L][a][b][step][over black/white] */
#define sp_Current sp_Wheel[1][1][1][0] /* Current color over black/white */
}
    SwatchPalette;

typedef unsigned short SwatchIndex;     /* A small integral type to hold SwatchPalette index. */

SwatchPalette   swatch_palette;
SwatchIndex     swatch_template[SWATCH_HEIGHT][SWATCH_WIDTH];
```

```
/*
 * Fast integer square root routine.
 * Relies on the previous input value being close to this one.
 */
static int
intsqrt(int x)
{
    int sqrtx;
    static int try = 0;

if (try <= 1)
        try = (x + 1) / 2;

while (TRUE)
    {
        if (try <= 1)
            return try;

sqrtx = x / try;

if (abs(sqrtx - try) <= 1)
            return sqrtx;

try = (sqrtx + try) / 2;
    }
}

/*
 * Current color in the centre with blends radiating out in 14 directions:
 *
 *            +L
 *       +L-a+b      +L+a+b
 *       4   3   2
 *       +L-a-b  5   1   +L+a-b
 *
 *       +b   6      0   +a
 *
```

```
           *         -a   7        13  -b
           *
           *         -L-a+b    8    12  -L+a+b
           *         9  10 11
5          *         -L-a-b       -L+a-b
           *         -L       (bottom half is negation of top half by radial symmetry)
           */
       static signed char delta[14][3] =
       {
10         /*L a b*/
           { 0, 1, 0},
           { 1, 1,-1},
           { 1, 1, 1},
           { 1, 0, 0},
15         { 1,-1, 1},
           { 1,-1,-1},
           { 0, 0, 1},
           { 0,-1, 0},
           {-1,-1, 1},
20         {-1,-1,-1},
           {-1, 0, 0},
           {-1, 1,-1},
           {-1, 1, 1},
           { 0, 0,-1},
25     };

/*
        * which_sector
        *
30      * Return which of the color wheel sectors the given point is in.
        * Sector are numbered according to the diagram above.
        * The given point should be translated so that the centre of
        * the wheel is (0, 0).
        *
35      * Parameters:
        * ox, oy    The coordinates of the point in question. Positive y is up.
        *
        * Returns:
```

- 11 -

```
   * The integer sector number. No error conditions.
   */
   static int
   which_sector(int ox, int oy)
 5 {
      int    sector;
      float  ta;
      int    i;
      /*
10    * Tan of 360/14 deg, 2*360/14 and 3*360/14.
      */
      static float   tantab[3] = {0.4815f, 1.2539f, 4.3812f};

if (ox == 0)
15       ta = 50.0f * oy;   /* Something large with sign of y. */
      else
         ta = (float)oy / ox;

if (ox >= 0)
20    {
         if (oy > 0)    /* First quadrant. */
         {
            for (i = 0; i < nels(tantab); i++)
            {
25             if (tantab[i] > ta)
                  break;
            }
            sector = i;
         }
30       else        /* Fourth quadrant. */
         {
            for (i = 0; i < nels(tantab); i++)
            {
               if (tantab[i] > -ta)
35                break;
            }
            sector = nels(delta) - 1 - i;
            if (sector == nels(delta))
```

- 12 -

```
            sector = 0;
        }
    }
    else
    {
        if (oy > 0)    /* second quadrant */
        {
            for (i = 0; i < nels(tantab); i++)
            {
                if (tantab[i] > -ta)
                    break;
            }
            sector = nels(delta)/2 - 1 - i;
        }
        else           /* third quadrant */
        {
            for (i = 0; i < nels(tantab); i++)
            {
                if (tantab[i] > ta)
                    break;
            }
            sector = nels(delta)/2 + i;
        }
    }
    return sector;
}

/*
 * init_swatch_template
 *
 * Initialise swatch_template to be an array of color indexes which, for any
 * particular filling of the swatch_palette, can be used to determine the RGBO
 * color belonging at any point in the color wheel.
 *
 * I.e. draw the color wheel using 'generic' colors. Only called once so
 * efficiency is not paramount. Drawing is done by looping through all pixels.
 * for each pixel which part of the wheel it is in is determined and a color
 * from the palette chosen. The index of this color is stored in the swatch
```

- 13 -

```
  * template.
  *
  * Parameters:
  * dx, dy    Pointers to ints through which the size of the watch will be stored.
5 */
  void
  init_swatch_template(int *dx, int *dy)
  {
  /*
10 * PALINDEX - return the integer the given field of the palette has when the
  * palette is regarded as an array of RGBO colors. Only used in this function.
  */
  #define PALINDEX(field)  (&swatch_palette.field - &swatch_palette.sp_Background)
      int    sector;
15    float  dist;
      int    x;
      int    y;
      int    ox;       /* x, y translated so that center is 0, 0. */
      int    oy;
20    int    step;
      int    over_white; /* Else over black. */

/*
       * If this assert fails it implies that the SwatchIndex type is too small
25     * and should go to a short (it was unsigned char when I wrote this assert).
       */
      ASSERT
      (
          (SwatchIndex)(sizeof(swatch_palette) / sizeof(RGBO))
30        ==
          sizeof(swatch_palette) / sizeof(RGBO),
          "swatch palette index overflow"
      );

35    ASSERT(dx != NULL && dy != NULL, "NULL parameters");

*dx = SWATCH_WIDTH;
      *dy = SWATCH_HEIGHT;
```

```
for (y = 0; y < SWATCH_HEIGHT; ++y)
{
  for (x = 0; x < SWATCH_WIDTH; ++x)
  {
    over_white = ((x / SWATCH_GRID_SIZE) ^ (y / SWATCH_GRID_SIZE)) & 1;
    if (x > 2 * SWATCH_OUTER_RADIUS)
    {
      /*
       * To the right of the circle. In the opacity grid.
       *
       * NB: This code is not running at the momemt because the swatch
       * is not that wide. All you need to do is make it wider (say 30)
       * for it to appear.
       */
      ox = x - 2 * SWATCH_OUTER_RADIUS;
      oy = SWATCH_HEIGHT - y;
      if (SWATCH_WIDTH - x <= 2 || y < 2)
      {
        swatch_template[y][x] = PALINDEX(sp_BackBlendLight[(NSTEPS - 1) / 2]);
        continue;
      }
      if (ox <= 2 || oy <= 2)
      {
        swatch_template[y][x] = PALINDEX(sp_BackBlendDark[NSTEPS - 1]);
        continue;
      }
      swatch_template[y][x] = PALINDEX(sp_Current[over_white]);
      continue;
    }
    ox = x - SWATCH_OUTER_RADIUS;
    oy = y - SWATCH_OUTER_RADIUS;
    dist = (float)intsqrt(ox * ox + oy * oy);
    if (dist < SWATCH_INNER_RADIUS)
    {
      /*
       * Central (current) color.
       */
      swatch_template[y][x] = PALINDEX(sp_Current[over_white])
```

- 15 -

```
       continue;
     }
     if (dist < SWATCH_INNER_RADIUS + 1.3)
     {
       /*
        * Set step to manhattan distance from top left of square bounding
        * inner circle.
        */
       step = ox + SWATCH_INNER_RADIUS - oy + SWATCH_INNER_RADIUS;
       step = step * NSTEPS / (SWATCH_INNER_RADIUS * 2);
       if (step < 0)
          step = 0;
       if (step < NSTEPS)
       {
          swatch_template[y][x] = PALINDEX(sp_Wheel[2][1][1][NSTEPS - step - 1][over_white]);
       }
       else
       {
          if ((step -= NSTEPS) >= NSTEPS)
             step = NSTEPS - 1;
          swatch_template[y][x] = PALINDEX(sp_Wheel[0][1][1][step][over_white]);
       }
       continue;
     }
     if (dist >= SWATCH_OUTER_RADIUS)
     {
       /*
        * Background color.
        */
       swatch_template[y][x] = PALINDEX(sp_Background); /* Known to be zero. */
       continue;
     }
     if (dist > SWATCH_OUTER_RADIUS - 3)
     {
       /*
        * Set step to manhattan distance from top left of square bounding
        * inner circle.
        */
```

```
       step = ox + SWATCH_OUTER_RADIUS - oy + SWATCH_OUTER_RADIUS;
       step = step * NSTEPS / (SWATCH_OUTER_RADIUS * 2);
       if (step < 0)
          step = 0;
 5     if (step < NSTEPS)
       {
          swatch_template[y][x] = PALINDEX(sp_BackBlendDark[NSTEPS - step - 1]);
       }
       else
10     {
          if ((step -= NSTEPS) >= NSTEPS)
             step = NSTEPS - 1;
          swatch_template[y][x] = PALINDEX(sp_BackBlendLight[step]);
       }
15     continue;
       }
       /*
        * In the anulus of blends. Convert dist to 0..1 for how far
        * along the blend the point is, and then to a step.
20      */
       dist = ((float)dist - SWATCH_INNER_RADIUS)
           / (SWATCH_OUTER_RADIUS - SWATCH_INNER_RADIUS);
       step = (int)(dist * NSTEPS);
       if (step >= NSTEPS)
25        step = NSTEPS - 1;
       sector = which_sector(ox, oy);
       if (((x / SWATCH_GRID_SIZE) ^ (y / SWATCH_GRID_SIZE)) & 1)
       {
          swatch_template[y][x]
30           = PALINDEX(sp_Wheel
                [delta[sector][0] + 1]
                [delta[sector][1] + 1]
                [delta[sector][2] + 1]
                [step][1]);
35     }
       else
       {
          swatch_template[y][x]
```

- 17 -

```
                = PALINDEX(sp_Wheel
                    [delta[sector][0] + 1]
                    [delta[sector][1] + 1]
                    [delta[sector][2] + 1]
                    [step][0]);
            }
          }
        }
    #undef PALINDEX
    }

/*
     * fill_swatch_palette
     *
     * Fill in all the colors in swatch_palette based on the central color
     * supplied.
     *
     *
     * Parameters:
     * cur_labo      A pointer to four floats giving the Lab color and opacity
     *               of the central region of the swatch.
     */
    void
    fill_swatch_palette(float const *cur_labo)
    {
        int    Li;
        int    ai;
        int    bi;
        int    step;
        int    i;
        float  rgb[3];
        float  xyz[3];
        float  limit_lab[3];
        float  blend_lab[3];
        float  blend;
        float  opacity;
        float  c;

DWORD  face_color;
```

- 18 -

```
       static BOOL    have_prev;
       static float   prev[4];

5      face_color = GetSysColor(COLOR_BTNFACE);

if
       (
          have_prev
10        &&
          prev[0] = = cur_labo[0]
          &&
          prev[1] = = cur_labo[1]
          &&
15        prev[2] = = cur_labo[2]
          &&
          prev[3] = = cur_labo[3]
       )
          return;
20     prev[0] = cur_labo[0];
       prev[1] = cur_labo[1];
       prev[2] = cur_labo[2];
       prev[3] = cur_labo[3];

25     swatch_palette.sp_Background.C[0] = (unsigned char)((face_color & 0x00FF0000) > > 16);
       swatch_palette.sp_Background.C[1] = (unsigned char)((face_color & 0x0000FF00) > > 8);
       swatch_palette.sp_Background.C[2] = (unsigned char)(face_color & 0x000000FF);
       swatch_palette.sp_Background.C[3] = (unsigned char) 0;

30     if (!have_prev)
       {
          /*
           * If we have ever been here before we would have already filled
           * in these invarient colors, so only do it once.
35         */
          for (i = 0; i < 3; + +i)
          {
             //swatch_palette.sp_Background.C[i] = 192;
```

- 19 -

```
        for (step = 0; step < NSTEPS; ++step)
        {
            swatch_palette.sp_BackBlendLight[step].C[i] = swatch_palette.sp_Background.C[i] + 70 * step / NSTEPS;
 5          swatch_palette.sp_BackBlendDark[step].C[i] = swatch_palette.sp_Background.C[i] - 70 * step / NSTEPS;
        }
    }
    swatch_palette.sp_Background.C[3] = 0;
10  for (step = 0; step < NSTEPS; ++step)
    {
        swatch_palette.sp_BackBlendLight[step].C[3] = 255;
        swatch_palette.sp_BackBlendDark[step].C[3] = 255;
    }
15  } have_prev = TRUE;
    XYZ_from_Lab(xyz, (float *)cur_labo);
    RGB255_from_XYZ(rgb, xyz);
20  opacity = cur_labo[3] / 100.0f;

for (Li = 0; Li < 3; ++Li)
    {
        limit_lab[0] = cur_labo[0] + DLAB * (Li - 1);
25      for (ai = 0; ai < 3; ++ai)
        {
            limit_lab[1] = cur_labo[1] + DLAB * (ai - 1);
            for (bi = 0; bi < 3; ++bi)
            {
30              limit_lab[2] = cur_labo[2] + DLAB * (bi - 1);
                blend = 0.0f;
                for (step = 0; step < NSTEPS; ++step)
                {
                    /*
35                   * We are setting more things than we need to here. We really
                     * only use 14 of the 27 possible combinations of +/=/-. L/a/b.
                     */
                    blend_lab[0] = cur_labo[0] * (1 - blend) + limit_lab[0] * blend
```

```
            blend_lab[1] = cur_lab0[1] * (1 - blend) + limit_lab[1] * blend;
            blend_lab[2] = cur_lab0[2] * (1 - blend) + limit_lab[2] * blend;
            XYZ_from_Lab(xyz, blend_lab);
            RGB255_from_XYZ(rgb, xyz);
            for (i = 0; i < 3; ++i)
            {
               c = 255 * (1 - opacity) + rgb[i] * opacity;
               swatch_palette.sp_Wheel[Li][ai][bi][step][1].C[i] = CLAMP255(c);
               c = rgb[i] * opacity;
               swatch_palette.sp_Wheel[Li][ai][bi][step][0].C[i] = CLAMP255(c);
            }
            swatch_palette.sp_Wheel[Li][ai][bi][step][0].C[3] = 255;
            swatch_palette.sp_Wheel[Li][ai][bi][step][1].C[3] = 255;
            blend += 1.0f / NSTEPS;
         }
        }
       }
      }
   }

/*
 * paint_swatch_to_dc
 *
 * Copy the color swatch specified by the swatch_template (set once) and
 * the swatch_palette (set when the selected color changes) to the given
 * dc at the given location. The swatch is fully halftoned. The swatch is
 * always SWATCH_WIDTH by SWATCH_HEIGHT pixels.
 *
 * Parameters:
 * dc       The destination DC.
 * tl_x     The destination left edge.
 * tl_y     The destination top edge.
 */
void
paint_swatch_to_dc(HDC dc, int tl_x, int tl_y)
{
   int      x;
   int      y;
```

- 21 -

```
    unsigned char *swatch_rgbo;
    RGBO       *rgbo;

/*
5    * Allocate a full 32 bit RGBO pixel map and copy the template.
     * transliterating through the palette, into it...
     */
    swatch_rgbo = malloc(sizeof(RGBO) * SWATCH_WIDTH * SWATCH_HEIGHT);
    if (swatch_rgbo == NULL)
10       return;
    rgbo = (RGBO *)swatch_rgbo;
    for (y = 0; y < SWATCH_HEIGHT; ++y)
    {
       for (x = 0; x < SWATCH_WIDTH; ++x)
15     {
          *rgbo++ = ((RGBO *)&swatch_palette)[swatch_template[y][x]];
       }
    }
    /*
20   * Then copy, possibly halftoning, the 32 bit RGBO pixels to the dc.
     */
    copy_rgbo_to_dc(dc, tl_x, tl_y, SWATCH_WIDTH, SWATCH_HEIGHT, swatch_rgbo);
    free(swatch_rgbo);
    }
25
    /*
     * pick_swatch_color
     *
     * Given a point in the swatch, return its color, based
30   * on the current color.
     */
    BOOL
    pick_swatch_color(LPRECT rect, POINT pt, float color[4], float const cur_labo[4])
    {
35     int   x;
       int   y;
       int   ox;
       int   oy;
```

- 22 -

```
     int    sector;
     float  dist;
     float  rgb[3];
     float  xyz[3];
5    float  lab[3];

x = pt.x - rect->left;
     y = pt.y - rect->top;
     if (x < 0 || y < 0)
10       return FALSE;
     y = (SWATCH_HEIGHT - 1) - y;
     if (x >= SWATCH_WIDTH || y >= SWATCH_HEIGHT)
         return FALSE;
     if (x > 2 * SWATCH_OUTER_RADIUS)
15   {
         color[0] = cur_labo[0];
         color[1] = cur_labo[1];
         color[2] = cur_labo[2];
         color[3] = cur_labo[3];
20       return TRUE;
     } ox = x - SWATCH_OUTER_RADIUS;
     oy = y - SWATCH_OUTER_RADIUS;
25   dist = (float)sqrt((double)ox * ox + (double)oy * oy);
     if (dist < SWATCH_INNER_RADIUS)
     {
         color[0] = cur_labo[0];
         color[1] = cur_labo[1];
30       color[2] = cur_labo[2];
         color[3] = cur_labo[3];
         return TRUE;
     }
     if (dist > SWATCH_OUTER_RADIUS)
35       return FALSE;
     dist = (dist - SWATCH_INNER_RADIUS) / (SWATCH_OUTER_RADIUS - SWATCH_INNER_RADIUS);
     sector = which_sector(ox, oy);
     lab[0] = cur_labo[0] * (1 - dist) + (cur_labo[0] + DLAB * delta[sector][0]) * dist;
```

- 23 -

```
    lab[1] = cur_labo[1] * (1 - dist) + (cur_labo[1] + DLAB * delta[sector][1]) * dist;
    lab[2] = cur_labo[2] * (1 - dist) + (cur_labo[2] + DLAB * delta[sector][2]) * dist;
    /*
     * Clamp the Lab color to RGB ranges.
5    */
    XYZ_from_Lab(xyz, lab);
    RGB255_from_XYZ(rgb, xyz);
    rgb[0] = (float)CLAMP255(rgb[0]);
    rgb[1] = (float)CLAMP255(rgb[1]);
10   rgb[2] = (float)CLAMP255(rgb[2]);
    XYZ_from_RGB255(xyz, rgb);
    Lab_from_XYZ(lab, xyz);

color[0] = lab[0];
15   color[1] = lab[1];
    color[2] = lab[2];
    color[3] = cur_labo[3];
    return TRUE;
}
```

What is claimed is:

1. A method of displaying color for selection, said method comprising the steps of:
   (a) displaying a first color is a first predefined area;
   (b) displaying at least one blend each in a corresponding area, wherein each said blend comprises a plurality of colors varying from one color at one end to another color at an opposite end of its corresponding area and wherein all of the displayed blends together form part of a predetermined color space;
   (c) selecting one color of said displayed blends by a single input operation;
   (d) displaying the selected blend color in the first predefined area; and
   (e) automatically displaying at least one further blend each in a corresponding area upon selection of said color, wherein each said further blend comprises a plurality of colors varying from selected color at one end to another color at an opposite end of its corresponding area and wherein said plurality of colors are distributed about said selected color with each color being dependent on a relative distance from said selected color in said predetermined color space, wherein said first predefined area is located in a central area and each of said blend areas are located radially around said central area, and wherein all of said blend areas together substantially represent a regular three-dimensional closed space within said predetermined color space.

2. The method according to claim 1, wherein said at least one of said blend colors in said blend area are being located substantially closest to said central location.

3. The method according to claim 2, wherein said blend areas are located in radially opposed pairs.

4. The method according to claim 3, wherein said radially opposed pairs comprise blends from a color substantially the same as said currently selected color, to respective second blend colors that are substantially oppositely opposed relative to said currently selected color in a predetermined color space.

5. The method according to claim 4, wherein said color space is the CIE L*a*b* color space.

6. The method according to claim 5, wherein said blends are substantially continuous in the CIE L*a*b* color space.

7. A method as claimed in claim 1, wherein steps (c) to (e) are repeated until a user desired color is selected for export.

8. An apparatus for displaying color selectable by user, said apparatus comprising:
   means for displaying a first color is a first predetermined area;
   means for displaying at least one blend each in a corresponding area, wherein each said blend comprises a plurality of colors varying from one color at one end to anothercolor at an opposite end of its corresponding area and wherein all of the displayed blends form part of a predetermined color space;
   means for selecting one color of said displayed blend by a single input operation;
   means for automatically displaying the selected blend color in the first predefined area; and
   means for displaying at least on further blend each in a corresponding area upon selection of said color, wherein each said further blend comprises a plurality of colors varying from said selected color at one end to another color at an opposite end of its corresponding area and wherein said plurality of colors are distributed about said selected color, with each color being dependent on a relative distance from said selected color in said predetermined color space, wherein said first predefined area is located in a central area and each of said blend areas are located radially around said central area, blend areas together substantially represent a regular three-dimensional closed space within said predetermined color space.

9. The apparatus according to claim 8, wherein each of said second colors is a predetermined distance in a color space from said currently selected color.

10. The apparatus according to claim 9, wherein said at least one of said blend colors in each second predefined area being located substantially closest to said central area.

11. The apparatus according to claim 10, wherein second predefined areas are located radially around said central area.

12. The apparatus according to claim 11, wherein said second predefined areas are located in radially opposed pairs.

13. The apparatus according to claim 12, wherein said radially opposed pairs comprise blends from a color substantially the same as said currently selected color, to second blend colors that are substantially opposed relative to said currently selected color in a predetermined color space.

14. The apparatus according to claim 13, wherein said color space is the CIE L*a*b* color space.

15. The apparatus according to claim 14, wherein said blends are substantially continuous in the CIE L*a*b* color space.

16. A color selection device comprising a color wheel having a radially central portion displaying a currently selected color and a series of radially increasing blends displayed around said central portion, said radially increasing blends being blends from said currently selected color to predetermined points adjacent said currently selected color a predetermined color space, wherein said currently selected colors and series of blends are automatically changeable upon selecting a color from one of said series of blends by a single input operation, and wherein said series of blends is dependent on said currently selected color, and wherein all of said radially increasing blends together substantially represent a regular three dimensional closed space within said predetermined color space.

17. The device according to claim 16, wherein said color space is CIE L*a*b* color space.

18. A method of generating colors for selection of a color by a user, said method comprising the steps of:
   (a) displaying a first blend color in a first area;
   (b) generating a plurality of color blends, each having said first blend color at one end and a second blend color at an opposite end and blend colors therebetween, wherein said blend colors gradually vary from said first blend color to said second blend color wherein said plurality of color blends together form part of a predetermined color space;
   (c) displaying said first color and said plurality of color blends, whereby said color blends are radially configured in corresponding blend areas around said first area dependent on the color blends position in the color space, with each said color blend having the first blend color at said one end positioned adjacent to said first area;

(d) selecting one of said displayed blend colors by a single input operation;

(e) generating a further plurality of color blends upon selection of said selected blend color, each of said further color blends having said selected blend color at one end of said corresponding blend and a third blend color at an opposite end of said blend, wherein said blend colors gradually vary from said selected blend color to said third blend color and wherein said further plurality of color blends together form part of said predetermined color space; and (f) displaying said selected blend color in the first area and said further plurality of blends, whereby said blends are radially configured in corresponding blend areas around said first area dependent on the blends position in the predetermined color space, with each blend having the corresponding selected blend color at said one end positioned adjacent to said first area, and wherein all of said blend areas together substantially represent a regular three dimensional closed space within said predetermined color space.

19. The method according to claim 18, further comprising the step of:

once iteration of steps (d), (e) and (f) has been completed, mapping a palette image using the plurality of blends corresponding to the resultant selected color blend.

20. The method of claim 20, further comprising the step of: (d) once interation of steps (a), (b) and (c) has been completed, mapping a palette image using the plurality of blends corresponding to the resultant selected first color.

21. A method as claimed in claim 18, wherein steps (c) to (f) are repeated until a user desired color is selected for export.

* * * * *

UNITED STATES PATENT AND TRADEMARK OFFICE
CERTIFICATE OF CORRECTION

PATENT NO. : 6,226,010 B1
DATED : May 1, 2001
INVENTOR(S) : Timothy Merrick Long It is certified that error appears in the above-identified patent and that said Letters Patent is hereby corrected as shown below:

<u>Column 3,</u>
Line 42, "L" should read -- L* --.

<u>Column 39,</u>
Line 4, "is" should read -- in --.
Line 50, "by user," should read -- by a user, --.
Line 57, "anothercolor" should read -- another color --.
Line 65, "on" should read -- one --.

<u>Column 40,</u>
Line 8, "area" should read -- area, and wherein all of said --.
Line 18, "wherein" should read -- wherein said --.

<u>Column 42,</u>
Line 11, "claim 20," should read -- claim 18, --.

Signed and Sealed this

Fourth Day of June, 2002

*Attest:*

*Attesting Officer*

JAMES E. ROGAN
*Director of the United States Patent and Trademark Office*